(12) United States Patent
Smith (10) Patent No.: US 7,083,313 B2
(45) Date of Patent: Aug. 1, 2006

(54) SIDE-EMITTING COLLIMATOR

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 16 days.

(21) Appl. No.: 10/878,846

(22) Filed: Jun. 28, 2004

(65) Prior Publication Data

US 2005/0286251 A1 Dec. 29, 2005

(51) Int. Cl.
*F21V 7/04* (2006.01)

(52) U.S. Cl. ................ 362/555; 362/327; 362/335; 362/800

(58) Field of Classification Search ............... 362/309, 362/327, 333, 335, 338, 545, 555, 800
See application file for complete search history.

(56) References Cited

U.S. PATENT DOCUMENTS 6,547,423 B1 * 4/2003 Marshall et al. ............ 362/333
6,679,621 B1 * 1/2004 West et al. ................. 362/327
6,724,543 B1 * 4/2004 Chinniah et al. ........... 362/327

* cited by examiner

*Primary Examiner*—Stephen F Husar
(74) *Attorney, Agent, or Firm*—Alix, Yale & Ristas, LLP (57) ABSTRACT

A side-emitting collimator employs a combination of refraction and internal reflection to organize light from a light source into oppositely directed collimated beams. A light source chamber over the light source is defined by substantially cylindrical and aspheric refracting surfaces positioned to gather light into the collimating lens. The aspheric refracting surfaces redirect a portion of the light from the light source into a direction perpendicular to the optical axis of the light source. The substantially cylindrical surfaces refract light from the light source onto an aspheric upper reflecting surface. Light incident upon the aspheric upper reflecting surface is collimated into a direction perpendicular to the optical axis of the light source. The side-emitting collimator includes mirror image collimator halves, each producing a collimated beam. The collimator halves are rotationally symmetric about a common axis of symmetry above a plane including the axis of symmetry.

18 Claims, 9 Drawing Sheets

SIDE-EMITTING COLLIMATOR

BACKGROUND OF THE INVENTION

1. Field of the Invention

The present invention relates generally to lenses for distributing light from a light source and more particularly to a lens for changing the effective direction of light emission for a light source.

2. Description of the Related Art

The use of LED's in warning and signaling lights is well known. Older models of LED's produced limited quantities of light over a relatively narrow viewing angle centered around an optical axis of the LED. These LED's were typically massed in compact arrays to fill the given illuminated area and provide the necessary light output. Modern LED's produce significantly greater luminous flux per component, permitting fewer LED's to produce the luminous flux required for many warning and signaling applications. It is known to arrange a small number of high-output LED's in a light fixture and provide each high-output LED with an internally reflecting collimating lens. The collimating lens gathers light from the LED into a collimated beam centered on the LED optical axis. Such an arrangement typically does not fill the light fixture, resulting in an undesirable appearance consisting of bright spots arranged against an unlit background. Light-spreading optical features on the outside lens/cover are sometimes employed to improve the appearance of the light fixture.

Figure 1:
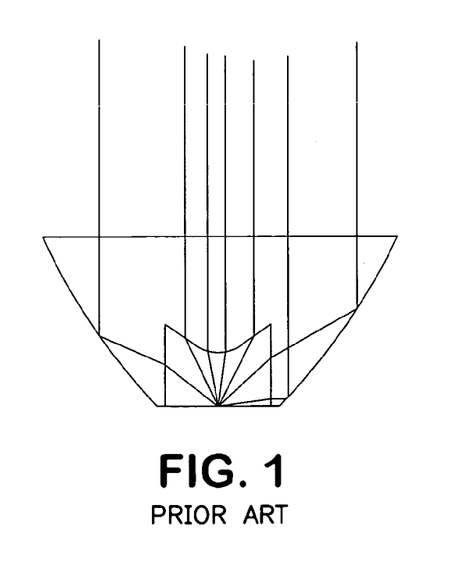
FIG. 1 is a side sectional view of a prior art collimator.

FIG. 1 illustrates a prior art collimator of a configuration frequently employed in conjunction with LED light sources. Light from an LED positioned in a cavity defined by the collimator is organized into a collimated beam aligned with the optical axis of the LED. The known internally reflecting collimator for an LED is a molded solid of light transmissive plastic such as acrylic. The radial periphery of the collimator is defined by an aspheric internal reflecting surface flaring upwardly and outwardly to a substantially planar light emission surface. The bottom of the collimator includes a cavity centered over the LED optical axis. The cavity is defined by a substantially cylindrical side-wall and an aspheric upper surface. The aspheric upper surface is configured to refract light emitted at small angles relative to the LED optical axis to a direction parallel with the LED optical axis. The shape of the aspheric upper surface is calculated from the refractive properties of the air/acrylic interface, the position of the LED point of light emission relative to the surface and the desired direction of light emission, e.g., parallel to the LED optical axis. The mathematical relationship between the angle of incidence of a light ray to a surface and the angle of the refracted ray to the surface is governed by Snell's Law: "The refracted ray lies in the plane of incidence, and the sine of the angle of refraction bears a constant ratio to the sine of the angle of incidence." (sin θ/sin θ'=contant, where θ is the angle of incidence and θ' is the angle of refraction)

To allow the collimator of FIG. 1 to be easily extracted from a mold, the substantially cylindrical side-wall of the cavity is typically canted at an angle of between 1° and 3° relative to the central axis of the collimator. The cavity is narrower at the top where the side-wall joins the aspheric upper surface than at the bottom of the collimator. For any particular point on the substantially cylindrical side-wall, the path of light refracted into the collimator can be calculated using Snell's law. The shape of the peripheral aspheric internal reflecting surface is calculated from the path of light refracted by the substantially cylindrical side-wall surface and the desired direction of light emission, e.g., parallel to the LED optical axis. The resulting aspheric internal reflecting surface redirects light incident upon it in a direction parallel to the optical axis of the LED.

The result is that substantially all of the light emitted from the LED is redirected parallel to the optical axis of the LED to form a collimated beam. This arrangement efficiently gathers light from the LED and redirects that light into a direction of intended light emission. Unless the light is somehow spread, the light from each LED appears to the viewer as a bright spot the size and shape of the collimator.

SUMMARY OF THE INVENTION

Briefly stated, a side-emitting collimator according to the present invention comprises a pair of collimator halves configured to meet over an LED to form a cavity defined by refracting surfaces. The upper boundary of each collimator half is defined by a surface configured to internally reflect light refracted into the collimator lens by one of the refracting surfaces. Each half of the side-emitting collimator redirects light from the light source in a direction substantially perpendicular to the optical axis of the light source. The side-emitting collimator redirects the light from an LED into diametrically opposed collimated beams perpendicular to the optical axis of the light source.

Each half of the side-emitting collimator includes an aspheric upper internal reflecting surface whose shape is calculated from the path of light refracted by the corresponding internal refracting surface. As used in this application, the term "aspheric" means "not spherical". The illustrated aspheric surfaces are created by rotating a non-circular curve about an axis of symmetry. These surfaces can be described as "rotationally symmetric" about the axis of symmetry. Each half of the side-emitting collimator defines one half of a cavity that receives the light source. The upper surface of the cavity includes two adjoining substantially cylindrical surfaces that meet over the optical axis of the LED light source. Each end of the cavity is defined by one half of an aspheric surface. The partial-cylindrical surfaces are positioned to refract light from the light source onto the upper internal reflecting surface. The partial aspheric refracting surface redirects light from the light source into a direction of light emission parallel to light reflecting from the partial aspheric upper internal reflecting surface.

These surface shapes and relationships are an example of surfaces that efficiently gather light from an LED and re-direct that light into a pair of opposed collimated beams perpendicular to the optical axis of the LED. The invention should not be construed as being limited to the particular disclosed surface shapes.

DETAILED DESCRIPTION OF THE PREFERRED EMBODIMENT

Figure 2:
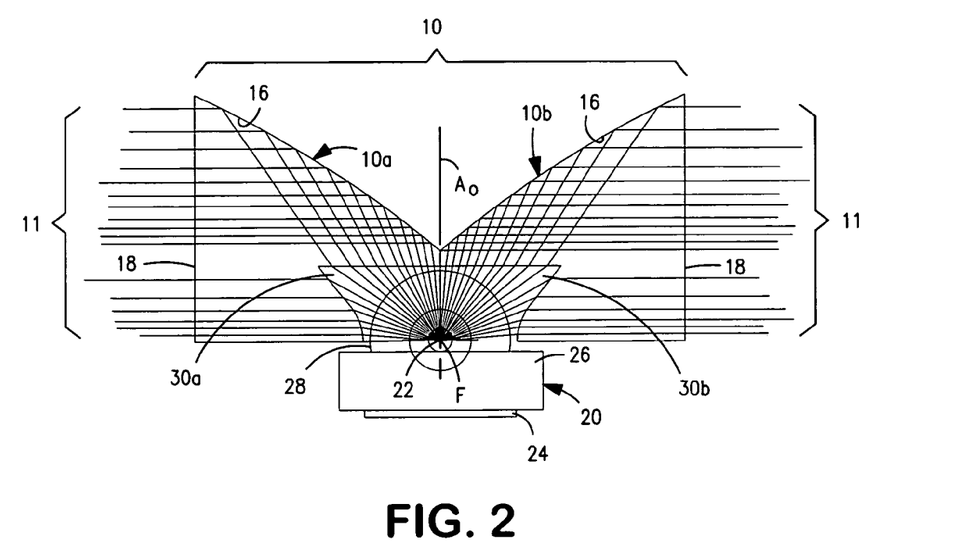
FIG. 2 is a sectional view through a side-emitting collimator in functional conjunction with an LED according to aspects of the present invention.

Exemplary embodiments of the side-emitting collimator will now be described with reference to FIGS. 2–6. FIG. 2 shows an exemplary side emitting collimator 10 in conjunction with an LED light source 20. The side-emitting collimator 10 organizes light from the LED 20 into a pair of opposed collimated beams 11 perpendicular to the optical axis $A_O$ of the LED 20. The LED 20 includes a base 26 above a heat-transmissive slug 24. A lens 28 extends upwardly from the base 26. The LED lens 28 surrounds a point of light emission 22. The point of light emission 22 in an LED 20 is defined by a semi-conductor chip (not shown) which emits light when energized by an electrical current. The illustrated LED lens 28 is of the high-dome or "lambertian" shape. An LED with this lens shape emits light in a half dome surrounding the optical axis $A_O$ of the LED. The side-emitting collimator 10 is constructed about a focal point F that preferably coincides with the point of light emission 22 of the LED 20. The left and right portions 10a, 10b of the side-emitting collimator 10 are identical. Each half 10a, 10b of the side-emitting collimator is a solid molded from optical-grade plastic, such as acrylic. Other forming methods and materials may also be compatible with the present invention.

Figure 3:
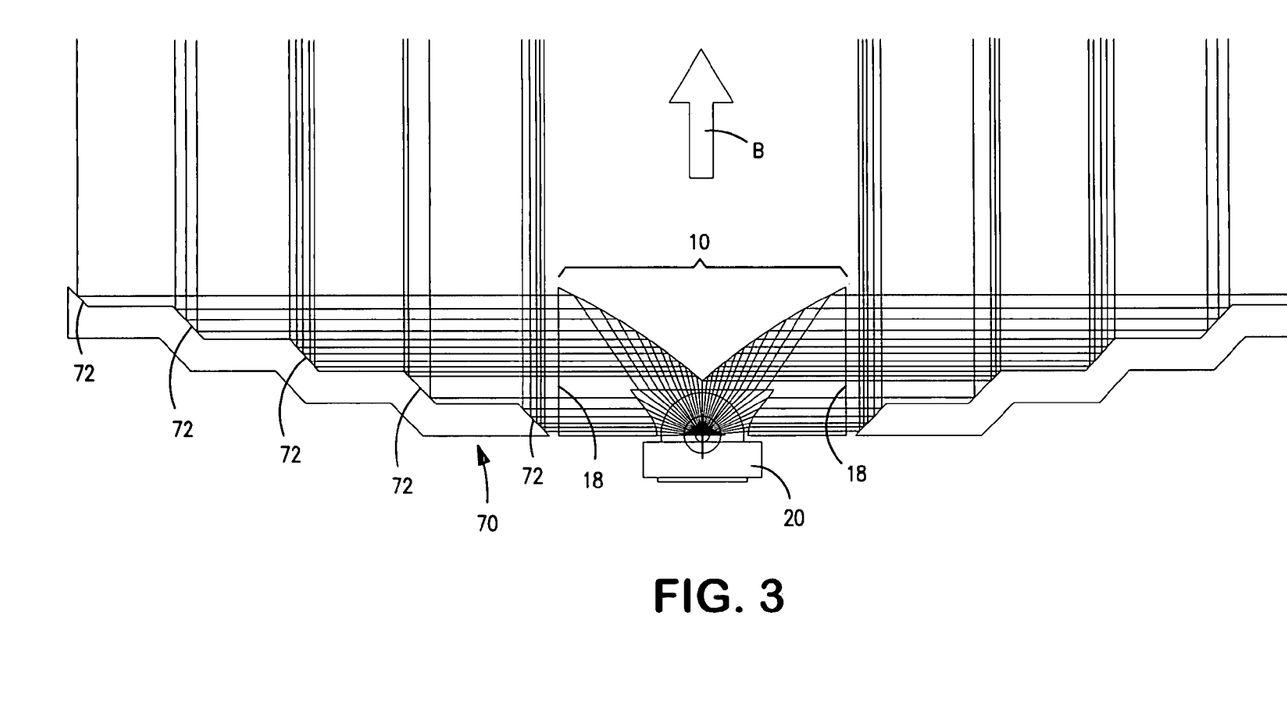
FIG. 3 is a sectional view of the side-emitting collimator and LED of FIG. 2 in conjunction with a reflector according to aspects of the present invention.
Figure 4:
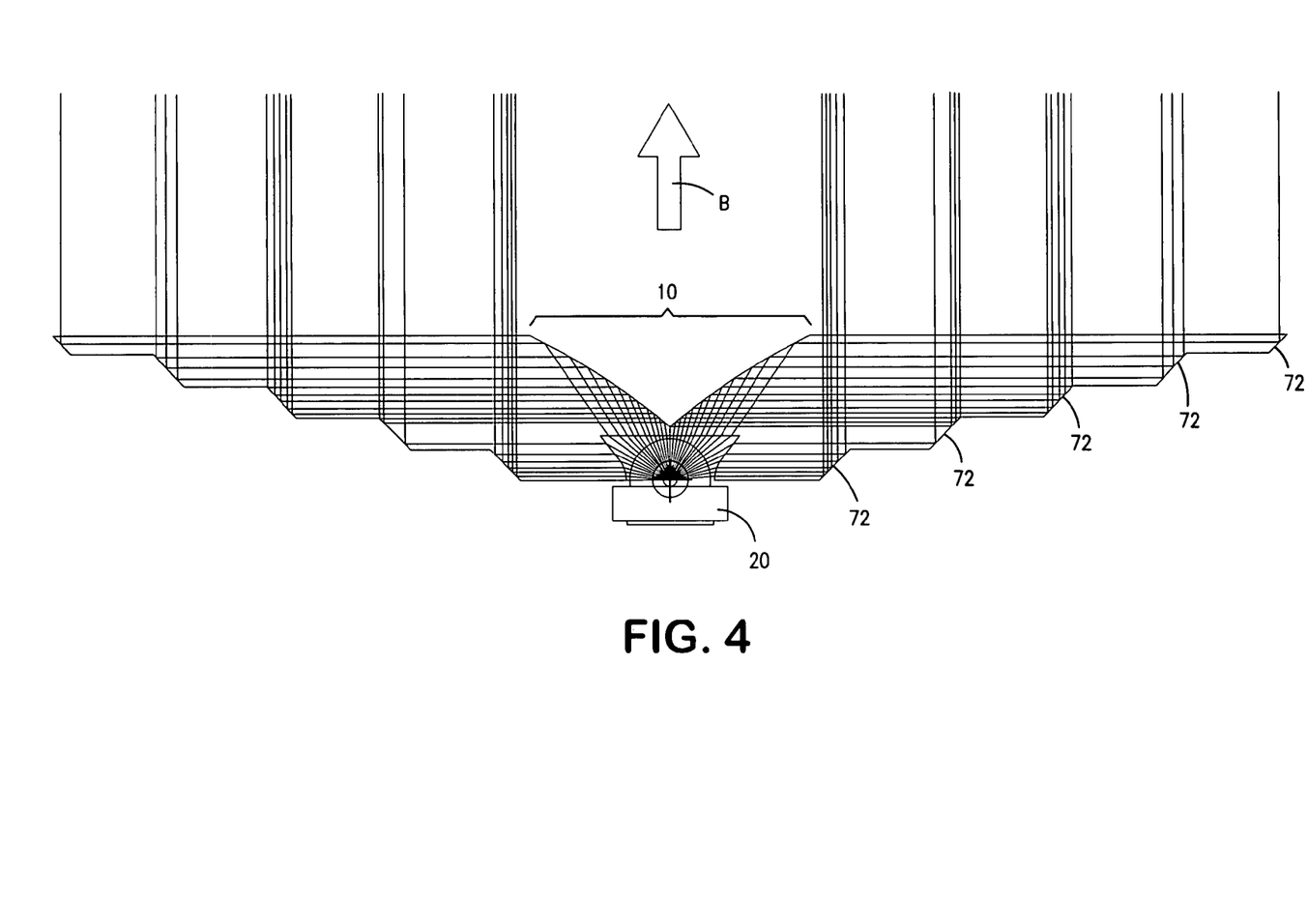
FIG. 4 is a sectional view through a side-emitting collimator incorporated into an internally reflecting lens in functional conjunction with an LED according to aspects of the present invention.
Figure 8:
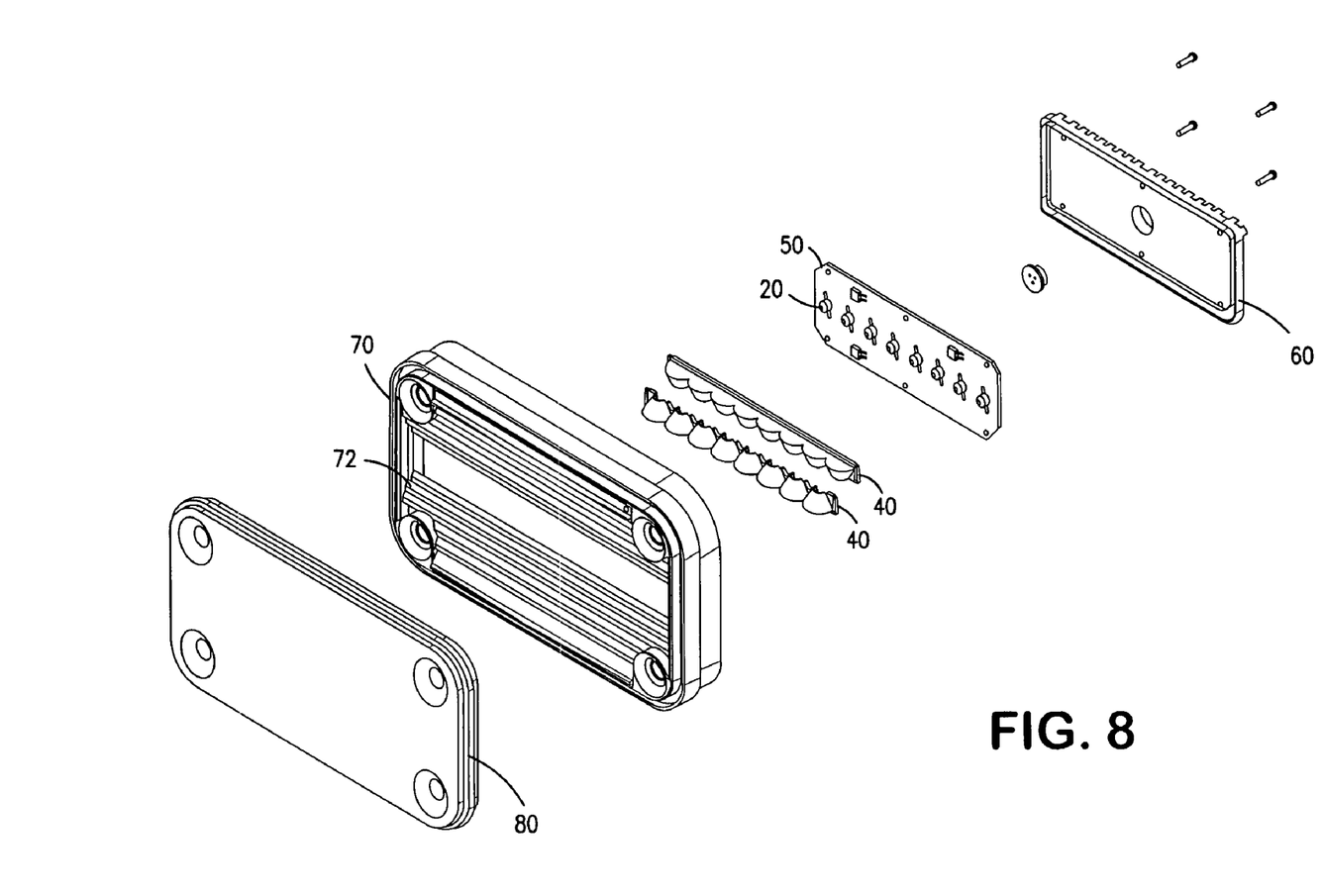
FIG. 8 is an exploded perspective view of a light assembly incorporating two rows of side-emitting collimator halves as shown in FIG. 6.
Figure 9:
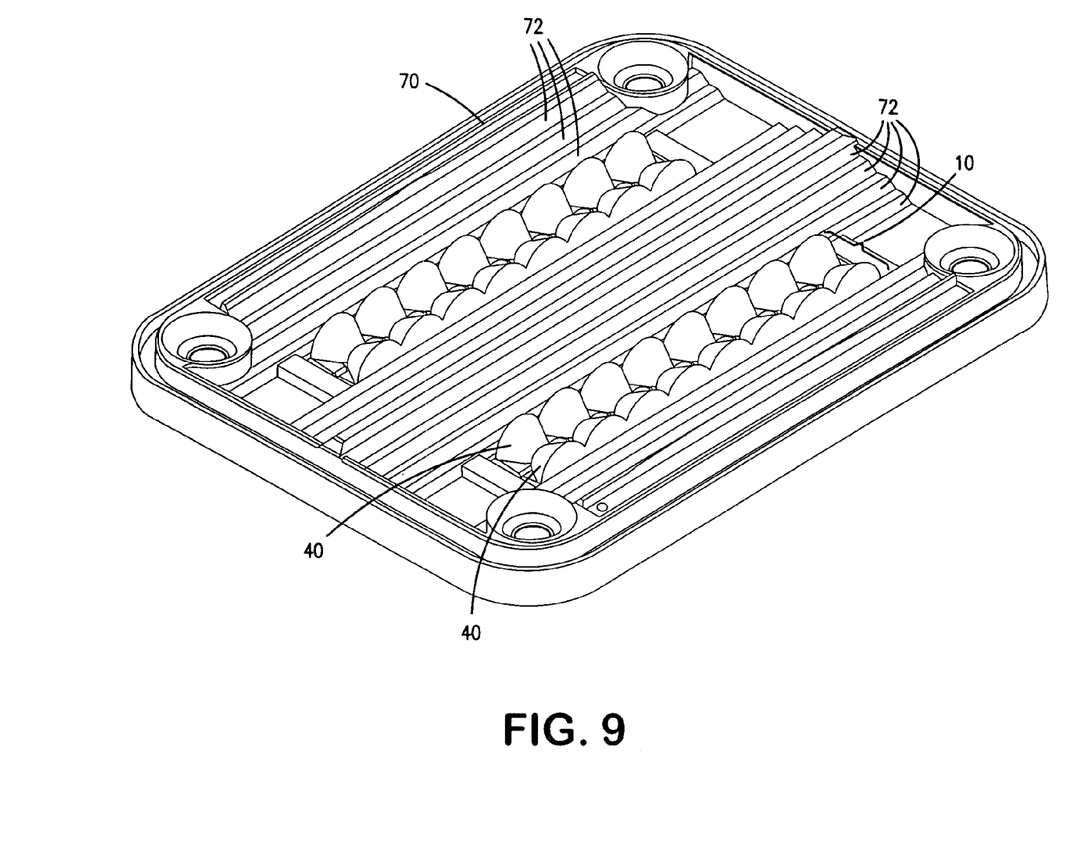
FIG. 9 is a perspective partially assembled view of the light assembly of FIG. 7.

FIGS. 3 and 4 are sectional views of light assemblies employing side-emitting collimators 10 according to aspects of the present invention. In the assembly of FIG. 3, angled reflecting surfaces 72 redirect the collimated beams after they emerge from the substantially planar light emission surfaces 18 of the side-emitting collimator 10. The angled reflecting surfaces 72 are laterally spaced apart and configured to each intercept a portion of the collimated beam from each side-emitting collimator 10. This arrangement distributes light from each LED 20 over a large area in a direction of light emission B for the light assembly. The reflecting surfaces 72 are also shown in FIGS. 8 and 9.

FIG. 4 is an alternative embodiment where the side-emitting collimator 10 is incorporated into a larger internally reflecting lens. The reflecting surfaces 72 shown in FIG. 4 are internal reflecting surfaces.

In the illustrated embodiments, the reflecting surfaces 72 are substantially planar, extend the length of the light assembly and are laterally equidistantly spaced. The reflecting surfaces 72 are oriented at an angle of approximately 45° relative to the optical axes $A_O$ of the LEDs 20. The shape, height, length, lateral spacing, and angular orientation of the reflecting surfaces may be selected to produce a particular desired pattern of light distribution. For example, reflecting surfaces that are convex when viewed in section (not shown) would increase the spread of the light pattern for the assembly.

Figure 5:
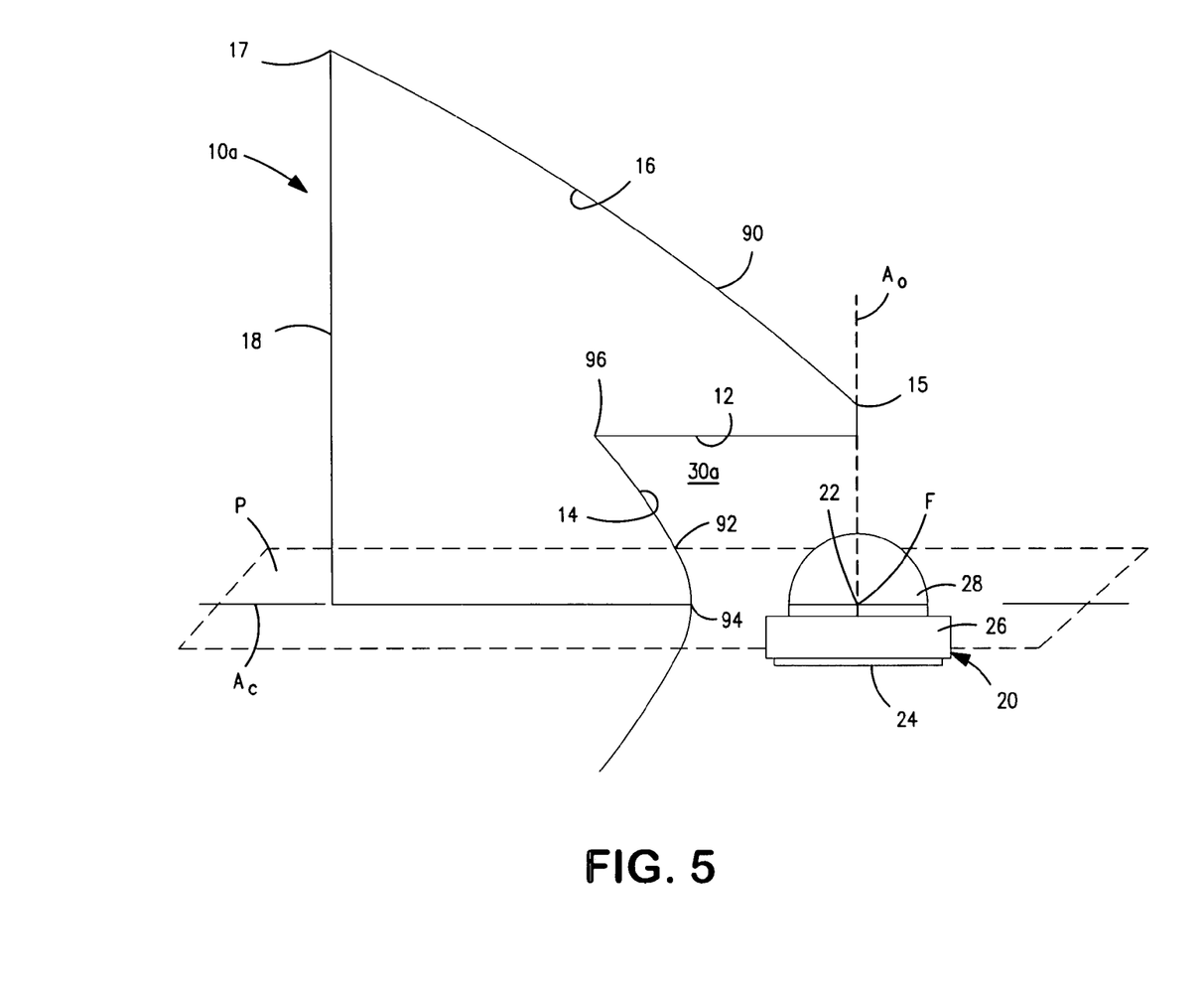
FIG. 5 is a side plan view of the side-emitting collimator and LED of FIG. 2.

FIG. 5 illustrates the geometrical relationships between an LED 20 and the refracting and reflecting surfaces of one half 10a of the side-emitting collimator 10. Each half 10a, 10b of the side-emitting collimator 10 includes an upper surface 16 produced by rotating a non-circular curve 90 about an axis of symmetry $A_C$ that extends beneath both halves 10a, 10b of the collimator 10. The shape of the curve 90 rotated about axis $A_C$ is calculated to reflect light refracted by the corresponding refracting surface 12 into the desired path of the collimated beam. The path of light gathered by the refracting surface 12 in the collimator can be calculated from the known values of: the shape of the surface 12; the angle of light incident upon the surface 12; and the refractive properties of the collimator lens material (acrylic plastic)/air interface using Snell's Law.

These calculations produce a non-spherical, or aspheric reflecting surface 16. As used in this application, the term "aspheric" means "not spherical". The illustrated aspheric surfaces 14, 16 are created by rotating a non-circular curve 90, 92 about an axis of symmetry $A_C$. The resulting aspheric surfaces can be described as "rotationally symmetric" about the axis of symmetry $A_C$. The non-circular curve 90 extends upwardly and outwardly from a first end 15 to a second end 17. When rotated at least approximately 180° about the axis of symmetry $A_C$, the curve 90 defines the upper aspheric reflecting surface 16 of each collimator half 10a, 10b.

The aspheric refracting surface 14 of each collimator half 10a, 10b is configured to refract a portion of the light from the LED 20 into a direction perpendicular to the optical axis $A_O$ of the LED. The shape of the non-circular curve 92 used to define the aspheric refracting surface 14 is calculated from the known values of: the desired angle of refraction in the collimator; the angle of light incident upon the surface 14; and the refractive properties of the collimator lens material (acrylic plastic)/air interface using Snell's Law. The non-circular curve 92 extends between an origin 94 on the axis of symmetry $A_C$ to a terminus 96 where the curve 92 intersects with the substantially cylindrical refracting surface 12. When rotated at least approximately 180° about the axis of symmetry $A_C$, the curve defines the aspheric refracting surface 14.

The illustrated collimator halves 10a, 10b are semi-circular in lateral section (perpendicular to the view of FIG. 5). A plane P, includes the axis of symmetry $A_C$ and the focus F of the collimator 10. Each collimator half 10a, 10b, is rotationally symmetrical about the axis of symmetry $A_C$ above plane P. Each half of the side-emitting collimator defines one half 30a, 30b of a cavity 30 that receives the light source (LED 20). The upper surface of the cavity includes two adjoining substantially cylindrical refracting surfaces 12 that meet over the optical axis $A_O$ of the LED light source. Each end of the cavity 30 is defined by the aspheric refracting surface 14. The substantially cylindrical surfaces 12 are positioned to refract light from the light source onto the upper internal reflecting surface. The aspheric refracting surface 14 redirects a portion of the light from the light source into a direction parallel to light reflecting from the aspheric upper reflecting surface.

Each half 10a, 10b of the side-emitting collimator 10 defines one-half 30a, 30b of a cavity 30 surrounding the LED lens 28. The cavity portion 30a, 30b defined by each half 10a, 10b of the side-emitting collimator 10 is defined by two refracting surfaces 12, 14. The substantially cylindrical surface 12 is centered on focal point F and extends perpendicularly to the optical axis $A_O$ of the LED 20. Surface 12 is described as a "substantially cylindrical" surface because it is not perfectly cylindrical with respect to the axis of symmetry $A_C$. In the illustrated embodiments, the substantially cylindrical surface 12 has a larger diameter at its open end (to the right in FIG. 5) than at the junction with the aspheric refracting surface 14. This particular surface configuration is not necessary to the optical performance of the collimator 10. Alternative surface configurations for the refracting surfaces may occur to one skilled in the art.

Figure 6:
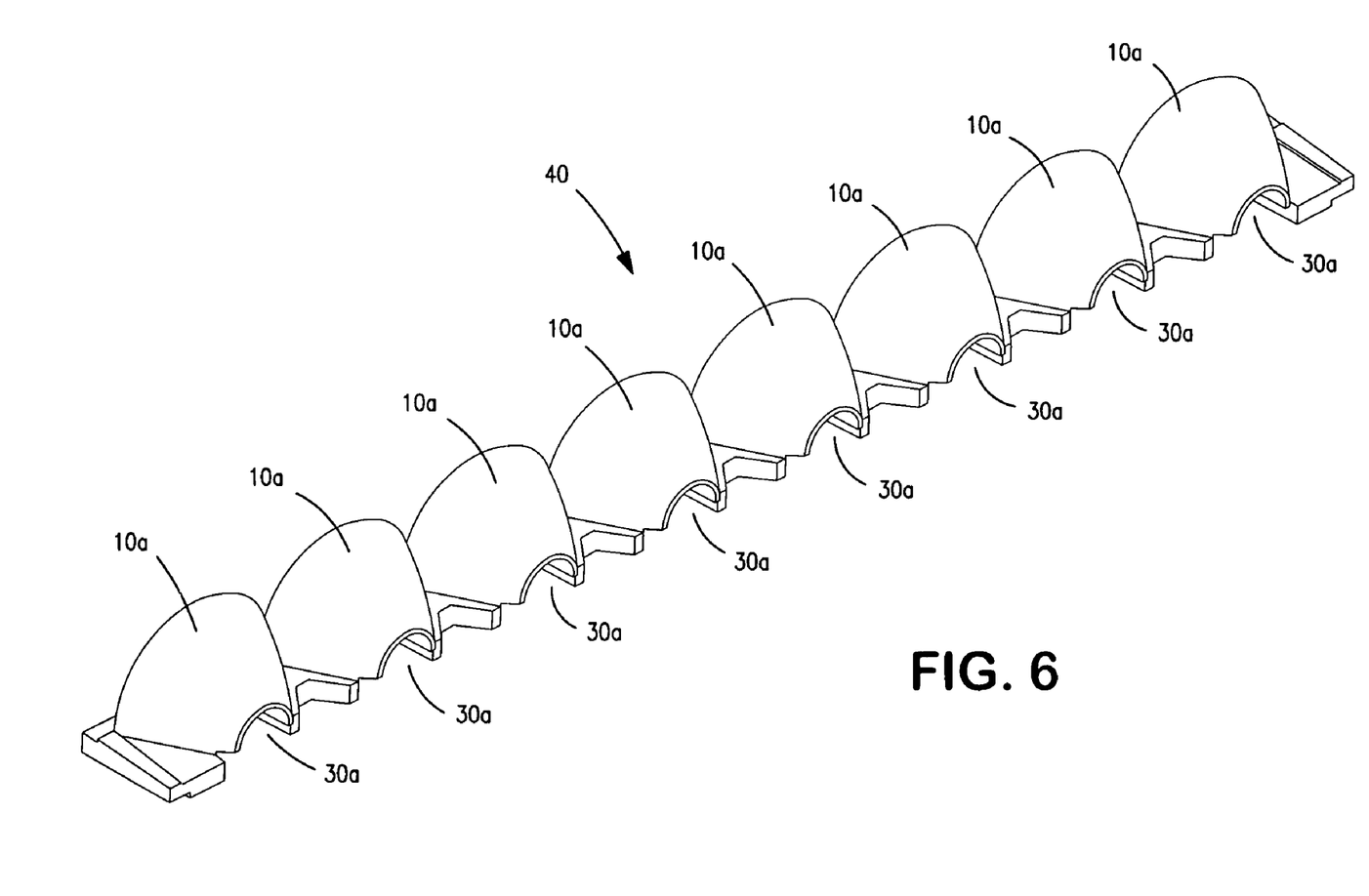
FIG. 6 is a perspective view of a row of side-emitting collimator halves according to aspects of the present invention.

There are many ways to form the lens shapes employed in the side-emitting collimator 10. One preferred method is to mold the lenses from clear plastic. FIG. 6 illustrates an exemplary configuration where a row 40 of side-emitting collimator halves 10*a* are molded from optically clear acrylic plastic having an index of refraction of approximately 1.491 at a wavelength of 550 nm. A mirror image row 40 of side-emitting collimator halves arranged as shown in FIG. 9 produces eight side-emitting collimators 10 for organizing the light from a row of eight LEDs 20. Alternatively, the side-emitting collimators may be molded as a single unit (not shown).

FIGS. 7–10 illustrate exemplary light assemblies incorporating rows of side-emitting collimators 10 over corresponding rows of LEDs 20 according to aspects of the present invention. A molded plastic reflector 70 provides structural support for the assemblies. PC boards 50 include a linear array of eight LED's 20. Two rows 40 of side-emitting collimator halves 10*a*, 10*b* are arranged with their respective cavity ends aligned over the row of LEDs to form side-emitting collimators 10 over each LED. The PC boards and rows of collimator-halves are clamped against the back of the reflector 70 by heat sinks 60 corresponding to the configuration of the PC boards 50. The illustrated heat sinks 60 are molded from heat-transmissive plastic to disperse heat generated by the LED's 20. A lens 80 protects the assembly and also may be provided with refracting features for spreading light coming off the parallel reflecting surfaces 72.

FIG. 8 illustrates a light assembly employing a single PC board 50, heat sink 60 and row of side-emitting collimators 10 constructed from two rows 40 of collimator halves 10*a*, 10*b*. The heat sink 60, reflector 70 and lens 80 of FIG. 8 function in the same manner as the corresponding components of FIG. 7. FIG. 3 illustrates the relative positions of the LED 20, side-emitting collimator 10 and reflecting surfaces 72 of the light assembly shown in FIG. 8. These relationships organize light from the row of LED's 20 so that it is emitted substantially evenly over the area of the light assembly. The inventive side-emitting collimator 10 and reflector efficiently distributes the light from the LEDs to improve the aesthetic appearance of the light radiation pattern without impairing compliance with relevant standards for warning and signal light pattern and intensity.

Figure 7:
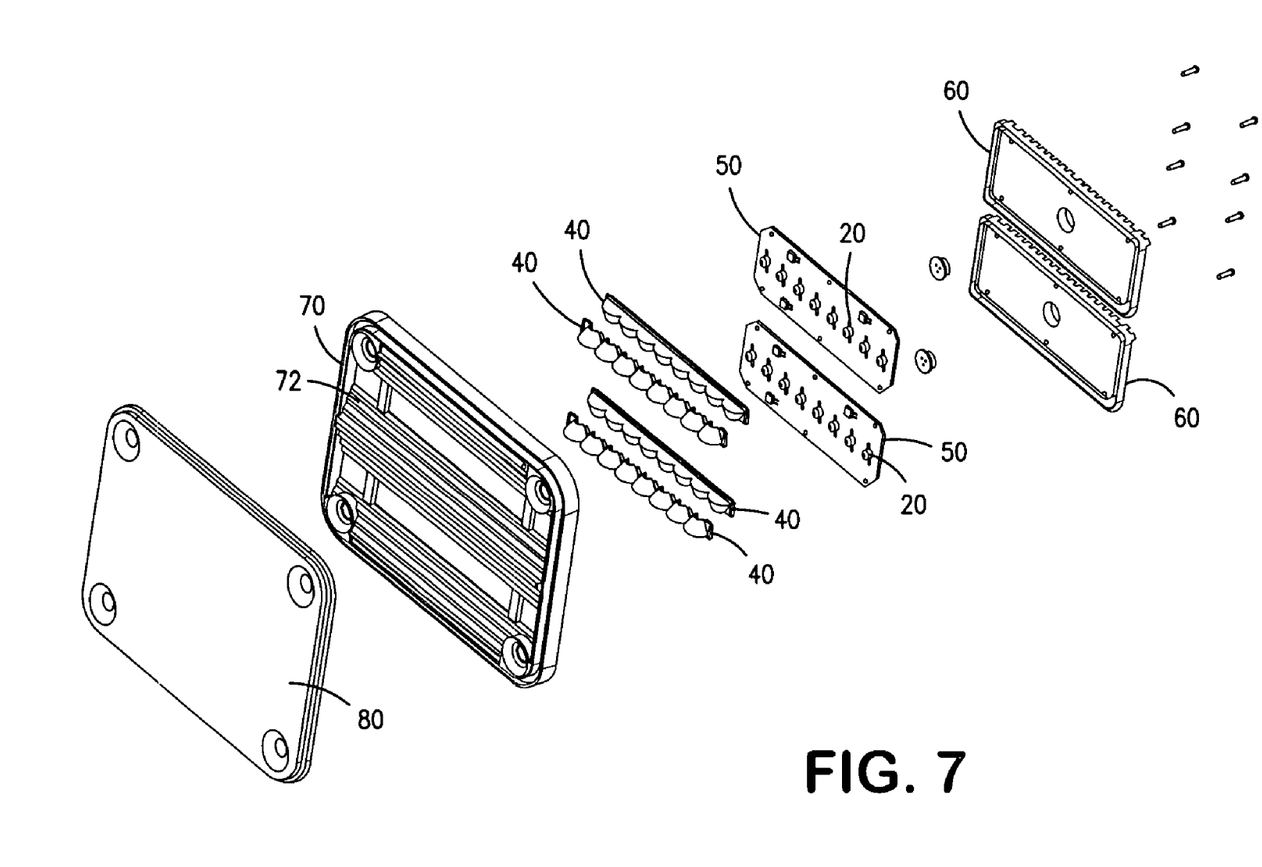
FIG. 7 is an exploded perspective view of a light assembly incorporating four rows of side-emitting collimator halves as shown in FIG. 6.
Figure 10:
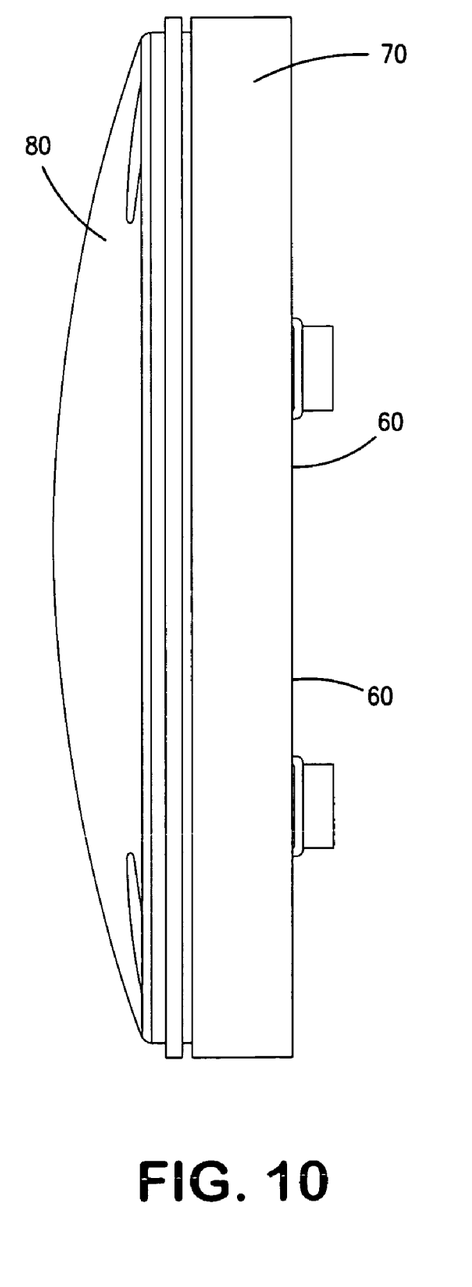
FIG. 10 is a side view assembled view of the light assembly of FIG. 7.

FIG. 9 is a top perspective view of the reflector of FIG. 7 in functional conjunction with the rows 40 of collimator halves 10*a*, 10*b*. The opposed collimated beams from each side-emitting collimator 10 are incident upon five parallel reflecting surfaces 72 extending along either side of each row of LEDs. This configuration effectively spreads the light over the surface area of the reflector 70. FIG. 10 is a side view of the assembled components shown in FIG. 7. An advantage of the illustrated light assembly configuration is an extremely low profile as shown in FIG. 10. This low profile permits a light assembly according to the present invention to be mounted on the exterior of a vehicle without requiring a large cutout to accommodate a deep reflector. The rear surface of the heat sinks 60 will have a large surface contact with what will typically be the metal skin of the emergency vehicle. This large surface contact will enhance heat transfer away from the LEDs of the light assembly.

While exemplary embodiments of the foregoing invention have been set forth for purposes of illustration, the foregoing description should not be deemed a limitation of the invention herein. Accordingly, various modifications, adaptations and alternatives may occur to one of skill in the art without departing from the spirit and the scope of the present invention.

The invention claimed is:

1. A side-emitting collimating lens adapted for collimating light from an LED having an optical axis into at least one collimated beam perpendicular to said optical axis, said collimating lens comprising:

first and second substantially identical collimator halves, each said collimator half comprising:
    a refracting surface partially defining a cavity for receiving the LED and configured to refract light from the LED into said lens; and
    an upper aspheric reflecting surface positioned to reflect light refracted by said refracting surface in a direction perpendicular to said optical axis, said upper aspheric reflecting surface flaring outwardly from a first end to a second end,
wherein said first and second collimator halves abut each other at said first ends, are symmetrical about a common axis on one side of a plane including said common axis, and said refracting surfaces meet to define a light source cavity.

2. The side-emitting collimating lens of claim 1, wherein said first and second collimator halves are molded solids of clear acrylic plastic.

3. The side-emitting collimating lens of claim 1, wherein said refracting surface comprises:
    a partial substantially cylindrical surface originating at said first end and extending toward said second end; and
    a partial aspheric surface meeting said partial-cylindrical surface intermediate said first and second ends.

4. The side-emitting collimating lens of claim 2, wherein the second end of said upper aspheric reflecting surface meets a substantially planar light emission surface.

5. The side-emitting collimating lens of claim 1, wherein said lens has a length measured along said common axis and said lens longitudinally terminates in substantially planar light emission surfaces intersecting the respective second ends of said first and second upper aspheric reflecting surfaces, said light emission surfaces being substantially perpendicular to said common axis.

6. The side-emitting collimating lens of claim 1, wherein said partial substantially cylindrical surface has a larger diameter at said first end than at said meeting with said partial aspheric surface.

7. A side emitting collimating lens comprising:
    a solid of light transmissive material having an index of refraction greater than air and partially bounded by:
    an upper surface including first and second aspheric reflecting surfaces having a first diameter at first ends meeting above a focal point and flaring outwardly to second ends having a second diameter greater than said first diameter, said first and second aspheric reflecting surfaces defined by a curve rotated at least approximately 180° about a common axis passing through said focal point; and a lower surface including:
  a substantially cylindrical refracting surface radially centered on said common axis and longitudinally centered over said focal point; and
  first and second oppositely directed aspheric refracting surfaces defined by a curve rotated at least approximately 180° about said common axis, said curve having an origin on said common axis and extending axially and radially away from said focal point to a terminus intersecting with said substantially cylindrical refracting surface,
wherein said substantially cylindrical refracting surface and said first and second aspheric refracting surfaces define a cavity centered on said focal point.

8. The side emitting collimating lens of claim 7, wherein said solid of refractive material is further bounded by first and second substantially planar light emission surfaces intersecting said first and second aspheric reflecting surfaces and substantially perpendicular to said common axis.

9. The side emitting collimating lens of claim 8, wherein said first and second light emission surfaces intersect said first and second aspheric reflecting surfaces equidistant from said focal point.

10. A side emitting collimating lens and light source combination comprising:
  first and second substantially identical lenses of light transmissive material having an index of refraction greater than air, each said lens including an upper surface, a lower surface, a truncated focal end and a flared light emitting end defined by a substantially planar light emitting surface, said truncated focal end and lower surface interrupted by a cavity defined by first and second refracting surfaces, said lenses arranged with said truncated focal ends in abutment and said cavities aligned to define a light source chamber and said flared light emitting ends being oppositely directed; and
  a light source which generates light from a point of light emission when energized, said light source positioned in said light source chamber,
  wherein light generated by said light source is incident upon the first and second refracting surfaces of said first and second lenses, a first portion of said light being refracted by the first refracting surface of said first lens to be incident upon the upper surface of said first lens, a second portion of said light being refracted by the second refracting surface of said first lens to pass through the light emission surface of said first lens, a third portion of said light being refracted by the first refracting surface of said second lens to be incident upon the upper surface of said second lens, and a fourth portion of said light being refracted by the second refracting surface of said second lens to pass through the light emission surface of said second lens.

11. The combination of claim 10, wherein the first and third portions of said light are internally reflected by the upper surfaces of said first and second lenses to pass through the light emission surfaces of said first and second lenses, respectively.

12. The combination of claim 10, wherein said light source has a total light output and said first, second, third and fourth portions include substantially all of said total light output.

13. The combination of claim 10, wherein said light source is an LED.

14. The combination of claim 10, wherein said first and second lenses are separate components.

15. The combination of claim 10, wherein the upper surface of both said first and second lenses are aspheric surfaces defined by rotating a curve at least approximately 180° about a common axis.

16. The combination of claim 10, wherein said first refracting surface is a substantially cylindrical surface radially centered on a common axis extending beneath both said first and second lenses.

17. The combination of claim 10, wherein said second refracting surface is an aspheric surface defined by rotating a curve at least approximately 180° about a common axis extending beneath both said first and second lenses, said curve having an origin on said common axis and extending to a terminus intersecting with said substantially cylindrical refracting surface.

18. The combination of claim 10, comprising a reflector arranged to re-direct light passing through said light emission surfaces into a direction of light emission for the combination.

* * * * *